United States Patent
Tokimoto

[19]

[11] Patent Number: 5,927,419
[45] Date of Patent: *Jul. 27, 1999

[54] BRAKE DEVICE IN VEHICLE

[75] Inventor: Hiroshi Tokimoto, Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,002

[22] Filed: Oct. 30, 1996

[30] Foreign Application Priority Data

Oct. 30, 1995 [JP] Japan ................................. 7-282225

[51] Int. Cl.[6] ................................................. B60K 31/02
[52] U.S. Cl. ......................... 180/170; 180/178; 180/179; 303/3; 303/113.4
[58] Field of Search .................................... 180/170, 171, 180/175, 176, 177, 178, 179, 167, 168, 169, 197; 364/426.041–426.046, 426.037; 303/125, 3, 155, 113.4, 113.3, 113.2; 701/70, 91, 93–98

[56] References Cited

U.S. PATENT DOCUMENTS

| 4,084,659 | 4/1978 | Abend et al. ............................. 180/179 |
| 4,884,203 | 11/1989 | Preis et al. ............................... 180/179 |
| 4,892,347 | 1/1990 | Steinhilber . | |
| 4,947,950 | 8/1990 | Heintz . | |
| 5,003,483 | 3/1991 | Hedström ................................. 180/179 |
| 5,050,698 | 9/1991 | Maeda et al. ............................ 180/178 |
| 5,215,159 | 6/1993 | Nishida ..................................... 180/179 |
| 5,238,080 | 8/1993 | Fastie ........................................ 180/178 |
| 5,400,864 | 3/1995 | Winner et al. ........................... 180/179 |
| 5,441,335 | 8/1995 | Stumpe et al. ........................ 303/113.4 |
| 5,513,906 | 5/1996 | Steiner ................. 303/113.4 |
| 5,564,797 | 10/1996 | Steiner et al. ........................ 303/113.4 |
| 5,594,645 | 1/1997 | Nishimura et al. ..................... 180/169 |

FOREIGN PATENT DOCUMENTS

| 6-171482 | 6/1994 | Japan . |
| 6-336163 | 12/1994 | Japan . |
| 8-175220 | 7/1996 | Japan . |

Primary Examiner—Douglas C. Butler
Attorney, Agent, or Firm—Armstrong, Westerman, Hattori, McLeland & Naughton

[57] ABSTRACT

In a vehicle including an automatic traveling device such as an auto-cruising device, an auto-following device, an auto-steering device and the like, which is capable of maintaining traveling of the vehicle in a state in which a driver has released his or her foot from an accelerator pedal, a relief valve and an on-off valve are incorporated in parallel in a pipeline which connects a master cylinder (2) and brake calipers. The closing of the on-off valve (6) during operation of the automatic traveling device ensures that even if the driver merely puts his or her foot on a brake pedal, a hydraulic braking pressure is not transmitted unless a depression force sufficient to permit the hydraulic braking pressure to exceed an opening pressure for the relief valve (5) is applied. When the driver applies a depression force on the brake pedal, the relief valve is opened, causing the brake caliper to generate a braking force, whereby the on-off valve is opened, and the operation of the automatic traveling device is released. Thus, a place for the driver to put his or her foot can be ensured without impairing the function of the automatic traveling device.

7 Claims, 9 Drawing Sheets

BRAKE DEVICE IN VEHICLE

BACKGROUND OF THE INVENTION

1. Field of the Invention

The present invention relates to a brake system in a vehicle including an automatic traveling device, such as an auto-cruising device, an auto-following device, an auto-steering device or the like, by which the vehicle can travel even in a state in which a driver of the vehicle has released his or her foot from an accelerator pedal.

2. Description of the Related Art

There is an auto-cruising device well-known in the art capable of maintaining traveling speed of a vehicle at a constant speed even if the driver releases his or her foot from an accelerator pedal during traveling of the vehicle. An example is disclosed in laid-open Japanese patent application number 8-175220, as follows. Such an auto-cruising device is of a structure such that when the driver depresses the accelerator pedal or a brake pedal during auto-cruising, the operation of the auto-cruising device is canceled.

For this reason, there is a problem in that the driver cannot put his or her foot on the accelerator pedal or the brake pedal during auto-cruising, and accordingly this requires great patience on the part of the driver and creates a very unpleasant feel with respect to placing his or her foot on the accelerator pedal or the brake pedal. Another problem is that, when it becomes necessary to depress the brake pedal due to a potential collision with another vehicle, or due to a traffic snarl ahead of the subject vehicle, the driver must move his or her foot near the brake pedal without depressing it for a standby operation, but such an operation is difficult.

SUMMARY OF THE INVENTION

Accordingly, it is an object of the present invention to provide a place for a driver to put his or her foot without defeating the function of the auto-cruising device, the auto-following device, the auto-steering device or the like.

To achieve the above object, according to a first aspect and feature of the present invention, there is provided a brake system in a vehicle including an automatic traveling device capable of maintaining traveling of the vehicle in a state in which a driver has released his or her foot from an accelerator pedal, wherein the brake system includes a control means which does not operate wheel brakes when the automatic traveling device is in operation and the depression force on a brake pedal is smaller than a predetermined value, and which operates the wheel brakes when the depression force on the brake pedal is equal to or larger than the predetermined value.

With the first feature of the present invention, the provision of the control means enables the vehicle to automatically travel in a state in which the driver has put his or her foot on the brake pedal. Thus, the driver is not inconvenienced in trying to find a place to put his or her foot, but also if the brake is required, the brake pedal can be depressed immediately.

According to a second aspect and feature of the present invention, in addition to the first feature, the depression force provided in a state when the driver has put his or her foot on the brake pedal is set to be smaller than the predetermined value.

With the second feature of the present invention, it is possible to avoid the application of an unnecessary braking force during traveling of the vehicle under operation of the automatic traveling device.

According to a third aspect and feature of the present invention, in addition to the first feature, the relationship of the braking force of the wheel brake to the depression force on the brake pedal is different during operation of the automatic traveling device and during non-operation of the automatic traveling device.

With the third feature of the present invention, it is possible to exhibit a usual braking characteristic during non-operation of the automatic traveling device, thereby preventing a sense of inconsistency incompatibility from being created.

According to a fourth aspect and feature of the present invention, in addition to the first feature, the automatic traveling device can be operated in a state in which the driver has put his or her foot on the brake pedal.

With the fourth feature of the present invention, when braking is required during operation of the automatic traveling device, the driver can depress the brake pedal immediately.

According to a fifth aspect and feature of the present invention, in addition to the fourth feature, the automatic traveling device can be operated in a state in which the driver does not put his or her foot on the brake pedal, when the vehicle speed is equal to or lower than a predetermined value.

With the fifth feature of the present invention, it is possible for the driver to assume a relaxed driving attitude.

According to a sixth aspect and feature of the present invention, in addition to the fifth feature, the automatic traveling device includes an automatic braking device, and during operation of the automatic braking device, the relationship of the braking force of the wheel brake to the depression force on the brake pedal is switched over to the relationship during non-operation of the automatic traveling device.

With the sixth feature of the present invention, it is possible to exhibit a usual braking characteristic during non-operation of the automatic traveling device, thereby preventing a sense of incompatibility from being generated.

According to a seventh aspect and feature of the present invention, in addition to the first feature, when the depression force on the brake pedal is equal to or larger than the predetermined value, a brake lamp is turned on.

With the seventh feature of the present invention, it is possible to avoid the turning-on of the brake pedal when no braking force is generated.

The above and other objects, features and advantages of the invention will become apparent from the following description of preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
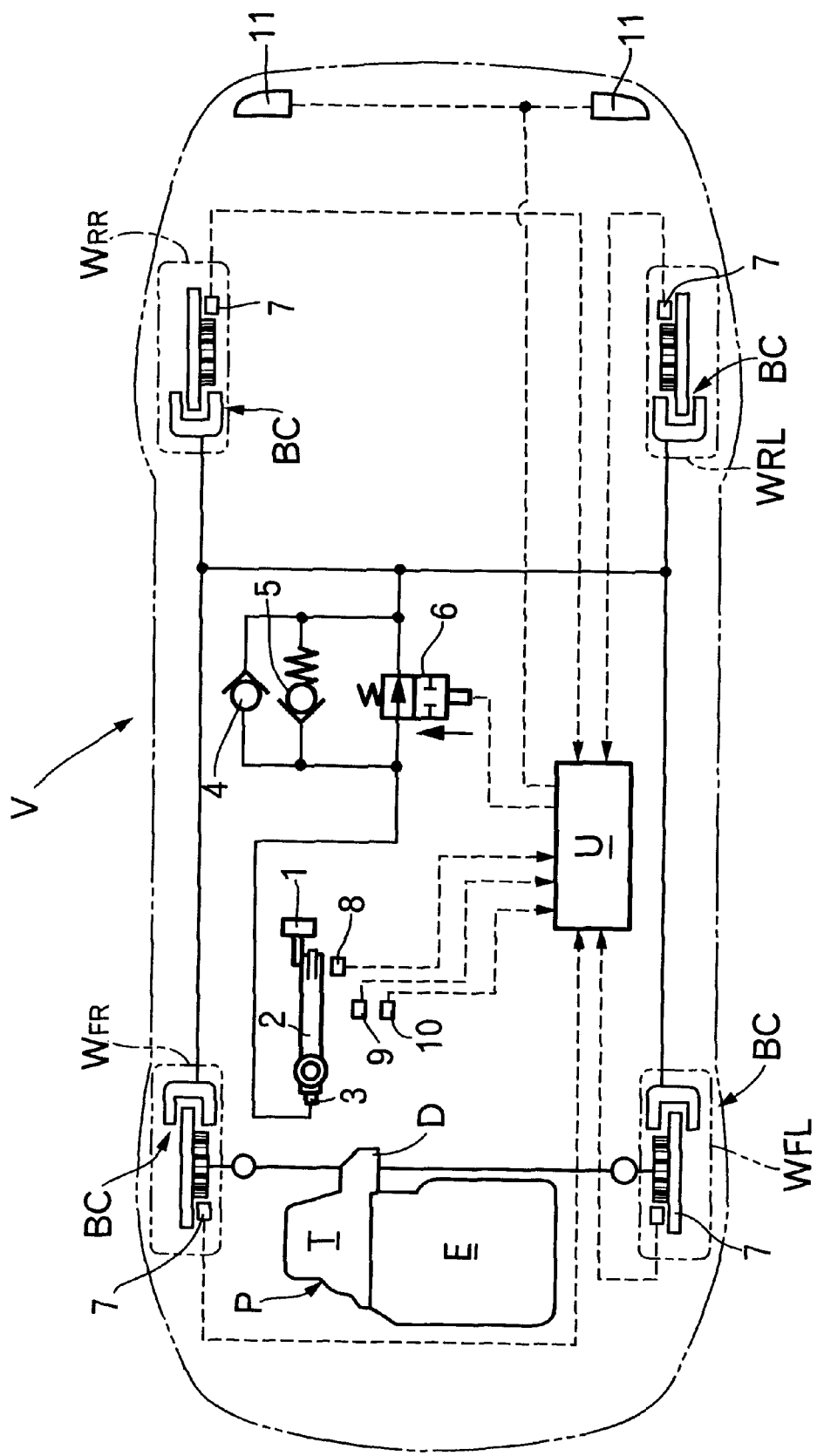
FIG. 1 is a diagrammatic illustration of the entire arrangement of a vehicle including a brake system according to a first embodiment of the present invention.

Referring to FIG. 1, a vehicle V shown in FIG. 1 includes a well-known type of auto-cruising device as an automatic traveling device, which is capable of allowing the vehicle to travel at a constant speed in a state in which a driver has released his or her foot from an accelerator pedal.

The vehicle V is a front wheel drive vehicle which includes left and right front wheels $W_{FL}$ and $W_{FR}$ which are driven wheels and left and right rear wheels $W_{RL}$ and $W_{RR}$ which are follower wheels. The left and right front wheels $W_{FL}$ and $W_{FR}$ are connected to and driven by a power unit P which is integrally provided with an engine E, a transmission T and a differential D. An output port 3 in a master cylinder 2 operated by a brake pedal 1 is connected through a pipeline to brake calipers BC which are mounted on the left and right front wheels $W_{FL}$ and $W_{FR}$ and the left and right rear wheels $W_{RL}$ and $W_{RR}$, respectively.

Incorporated in parallel in the above-mentioned pipeline are a check valve 4 which blocks the transmission of a hydraulic pressure from the master cylinder 2 to the brake calipers BC and permits the transmission of the hydraulic pressure from the brake calipers BC to the master cylinder 2, a relief valve 5 which blocks the transmission of the hydraulic pressure from the brake calipers BC to the master cylinder 2 and permits the transmission of the hydraulic pressure from the master cylinder 2 to the brake calipers BC with a predetermined opening pressure, and an on-off valve 6 comprised of a solenoid valve. The on-off valve 6 is in an opened state when a solenoid is in a non-energized state. The on-off valve 6 is closed by energization of the solenoid.

The following signals are input to an electronic control unit U: signals from speed sensors 7 mounted on the left and right front wheels $W_{FL}$ and $W_{FR}$ and the left and right rear wheels $W_{RL}$ and $W_{RR}$ for detecting wheel speeds Vw or a vehicle speed Vv (not shown); a signal from a brake switch 8 for detecting the operation of the brake pedal 1; a signal from an auto-cruising set switch 9 for operating the auto-cruising device; and a signal from an auto-cruising reset switch 10 for releasing the operation of the auto-cruising device. Further, the electronic control unit U controls the opening and closing of the on-off valve 6 based on the signals from the sensors and the switches 7, 8, 9 and 10 and controls the turning-ON/OFF of brake lamps 11, 11.

Figure 4:
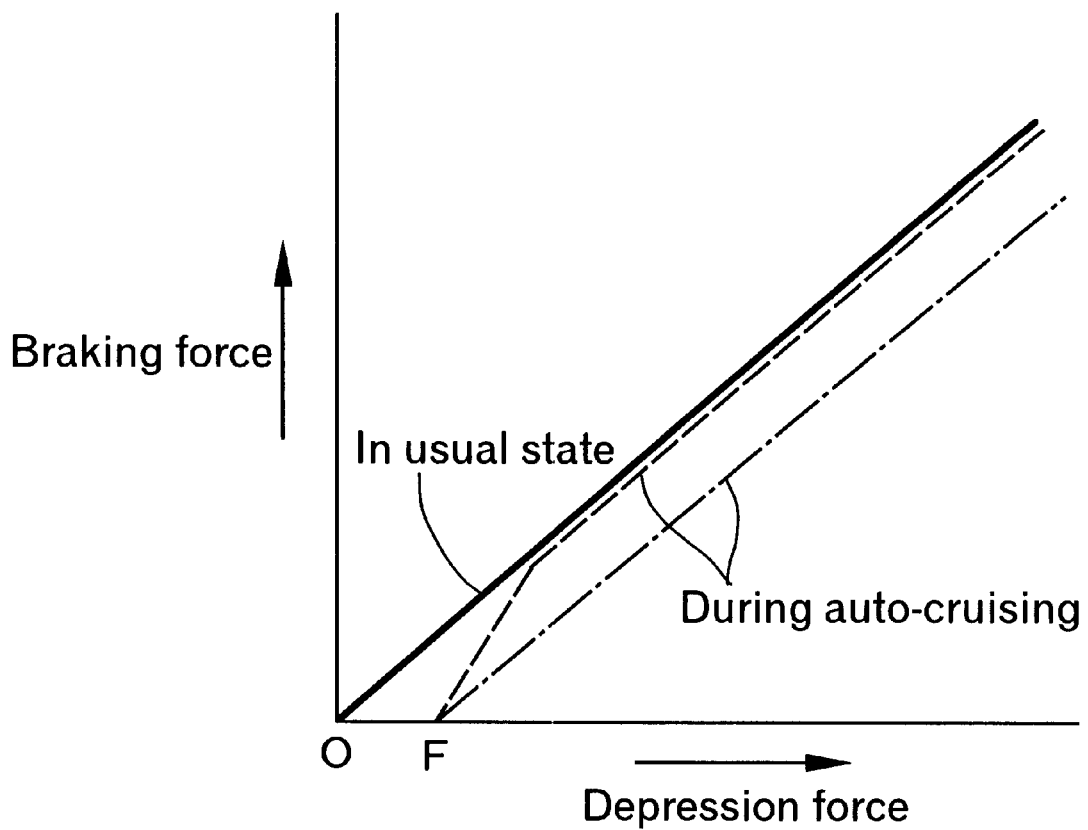
FIG. 4 is a graph illustrating the relationship between the depression force on a brake pedal and the braking force of brake calipers.

As shown in FIG. 4, in a usual state in which the on-off valve 6 is in its opened state, a hydraulic braking pressure generated by the master cylinder 2 by depression of the brake pedal 1 is transmitted to the brake calipers Bc without being passed through the relief valve 5 and hence, a braking force is increased in proportion to an increase in depression force. However, during auto-cruising with the on-off valve 6 in its closed state, a hydraulic braking pressure generated by the master cylinder 2 is transmitted to the brake calipers BC through the relief valve 5 and hence, a braking force is not generated before the depression force reaches a predetermined value F so that the hydraulic braking pressure from the master cylinder 2 exceeds the opening pressure for the relief valve 5. When the depression force is increased beyond the predetermined value F, the braking force is increased as shown by a one-dot dashed line in FIG. 4 in accordance with such increase in depression force.

In this case, it may be arranged such that when the depression force reaches the predetermined value F, the on-off valve 6 may be once closed, and then, the on-off valve 6 may be brought into an opened state while being repeatedly opened and closed at a short cycle in accordance with a subsequent increase in depression force, thereby providing a characteristic shown by a dashed line in FIG. 4. In either case, even if the brake pedal 1 is depressed with a depression force smaller than the predetermined depression force F during auto-cruising, the wheel brakes BC generate no braking force. The magnitude of the predetermined depression force F is set at a value slightly higher than a depression force generated when the driver merely puts his or her foot on the brake pedal 1. That is, with a depression force generated when the brake pedal 1 is merely used as a foot rest, the wheel brakes BC cannot generate a braking force.

The operation of the embodiment of the present invention having the above-described construction will be described below with reference to a flow chart shown in FIGS. 2 and 3.

First, when the auto-cruising switch 9 is turned ON at step S1, the on-off valve 6 is moved in a direction of an arrow from an opened position shown in FIG. 1 into a closed position at step S2, thereby permitting the master cylinder 2 and the wheel brakes BC to be put into communication with each other through the relief valve 5, and an adding timer T is started at step S3. At this time, if the driver does not put his or her foot on the brake pedal 1 and the brake switch 8 is not turned ON at step S4, the count value of the timer T is incremented for every loop at step S5. If a predetermined time is lapsed before turning ON of the brake switch 8 at step S4 and the count value of the timer T exceeds α at step S6, the driver is informed of "depress the brake pedal" by a voice or the like at step S7.

At subsequent step S8, the adding timer T is started again. If the brake switch 8 is not turned ON at step S9, the count value of the timer T is incremented in every loop at step S10. If a predetermined time is lapsed before turning ON of the brake switch 8 at step S9, and the count value of the timer T exceeds β, the on-off valve 6 is returned to its opened position shown in FIG. 1 at step S12, so that the master cylinder 2 and the wheel brakes BC are put into direct communication with each other without going through the relief valve 5. The driver is informed that "the auto-cruising is released" by a voice or the like at step S13, and an auto-cruising command is canceled without being put into execution.

In other words, when the driver does not depress the brake pedal 1 even if a predetermined time has been lapsed from the turning-ON of the auto-cruising switch 9, the driver is informed to "depress the brake pedal". When the driver does not depress the brake pedal even if a predetermined time has elapsed, the driver is informed that "the auto-cruising is released" and thus, the auto-cruising is released. Therefore, unless the driver depresses the brake pedal 1, the auto-cruising cannot be set.

Now, even if the driver puts his or her foot on the brake pedal 1 at step S4 or at step S9, the brake lamps 11, 11 are maintained in their OFF state at step S14. If it is determined at step S15 that the wheel deceleration dVw/dt which is a time differentiation value of the wheel speed Vw is equal to or larger than a predetermined value a and the driver has an intention of braking the vehicle at step S15, the brake lamps 11, 11 are turned on at step S16. Further, at step S12, the on-off valve 6 is returned to the opened position, and at step S13, the driver is informed that "the auto-cruising is released" and the auto-cruising command is canceled without being put into execution. On the other hand, if it is determined at step S15 the wheel deceleration dVw/dt is smaller than the predetermined value a and the driver does not have an intention of braking the vehicle, the auto-cruising is then actually set at step S17. In this manner, the need for measures to meet the difficulties involving the brake switch 8 can be eliminated by actually setting the auto-cruising after tuning-ON of the brake switch 8.

If the driver depresses the brake pedal 1 during traveling of the vehicle under the operation of the auto-cruising device and it is determined at step S18 that the wheel deceleration dVw/dt is equal to or larger than the predetermined value a and the driver intends to perform a vehicle braking operation, the processing is passed to steps S16, S12 and S13, at which point the auto-cruising is released. If it is determined at step S18 that the deceleration dVw/dt is smaller than the predetermined value a and the driver does not intend to perform a vehicle braking operation, the time T is set at step S19. If the driver depresses the brake pedal 1 to turn ON the brake switch at step S20, the driver turns ON the auto-cruising switch 10 at step S21, whereby the traveling of the vehicle is continued under the operation of the auto-cruising device, until the auto-cruising is released at step S22.

If the driver releases his or her foot from the brake pedal 1 to turn OFF the brake switch 8 at step S20 during traveling of the vehicle under operation of the auto-cruising device, the count value of the timer T is incremented in every loop at step S23. If the predetermined time is lapsed and the count value of the timer T exceeds γ at step S24 before turning-ON of the brake switch 8 at step S20, the driver is informed to "depress the brake pedal" by a voice or the like at step S25. The value of γ is set larger than the value of α used at step S6.

At subsequent step S26, the adding timer T is started again, and the brake switch 8 is not turned ON at step S27, the count value of the timer T is incremented in every loop at step S28. If the predetermined time is lapsed before turning ON of the brake switch 8 at step S27 and the count valve 6 of the timer T exceeds β at step S20, the on-off value is returned to the opened position at step S30, and the driver is informed that "the auto-cruising is released" and thus, the auto-cruising is released.

In other words, if the driver does not put his or her foot on the brake pedal 1 even if a predetermined time has elapsed from the time when the driver has released his or her foot from the brake pedal 1 during traveling of the vehicle under the operation of the auto-cruising device, the driver is informed to "depress the brake pedal". When the driver does not put his or her foot on the brake pedal 1 even if a predetermined time has elapsed, the driver is informed that "the auto-cruising is released" and thus, the auto-cruising is released.

Thus, unless the driver puts his or her foot on the brake pedal 1, the auto-cruising device cannot be actually operated. Even if the driver puts his or her foot on the brake pedal 1 during traveling of the vehicle under the operation of the auto-cruising device, a braking force cannot be generated and the brake lamps 11, 11 cannot be also turned on, unless the driver consciously applies a depression force. Therefore, the driver is not inconvenienced in finding a place to put his or her foot, but also if the brake is required, the brake pedal 1 can be depressed immediately.

A second embodiment of the present invention will now be described with reference to FIGS. 5 and 6.

The above-described first embodiment employs the auto-cruising device as the automatic traveling device, but the second embodiment employs an auto-following device as the automatic traveling device. An example is disclosed in laid-open Japanese patent application number 6-171482, as follows. The auto-following device controls the engine output or the brake device to keep the distance between a subject vehicle and a vehicle traveling ahead of the subject vehicle at a predetermined value, and includes an auto-brake device for performing a braking based on the determination provided by the electronic control unit U in addition to a braking intentionally performed by a driver. The auto-following device enables the vehicle to automatically travel in a state in which the driver has released his or her foot from the brake pedal.

Figure 2:
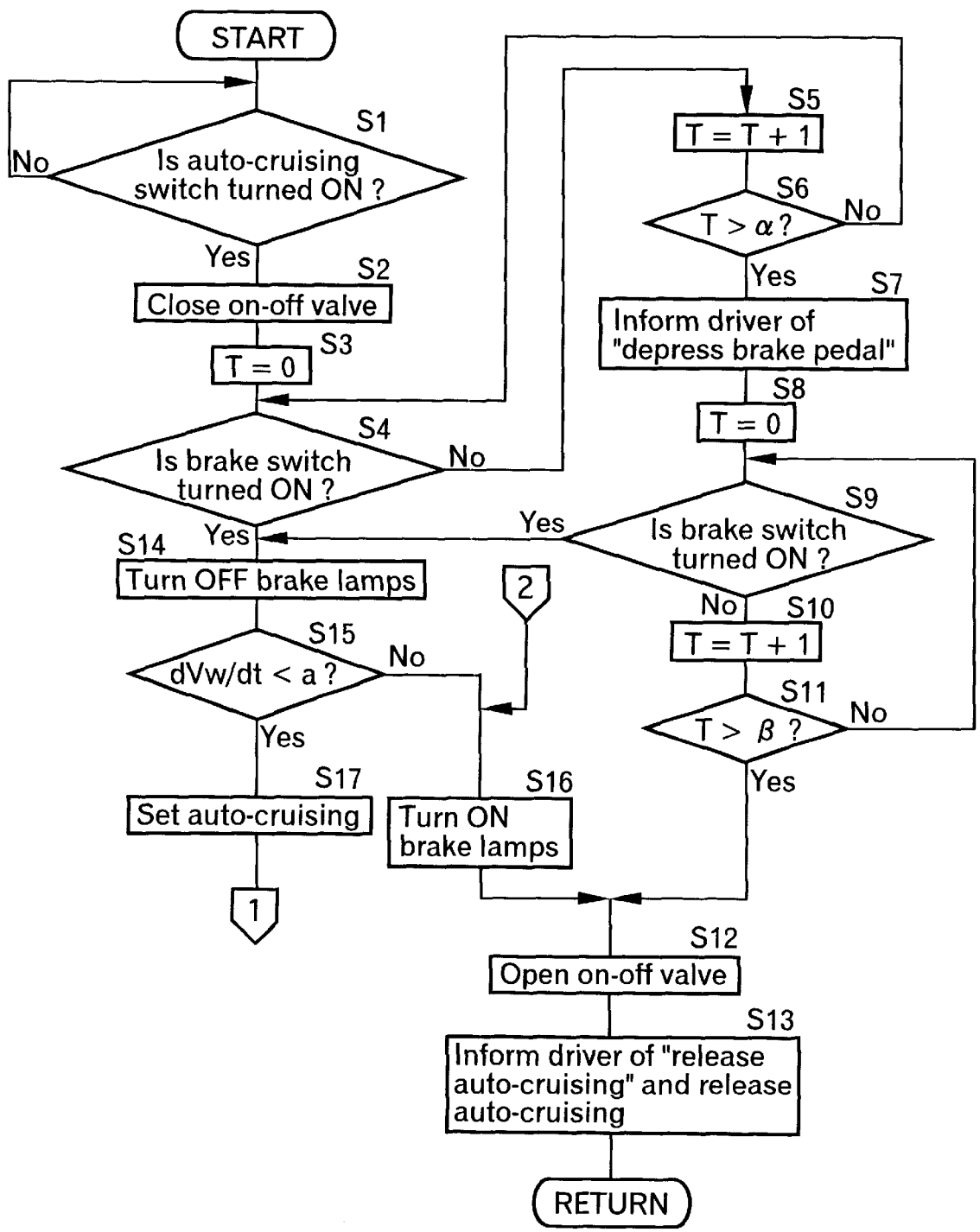
FIG. 2 is a first portion of a flow chart.
Figure 3:
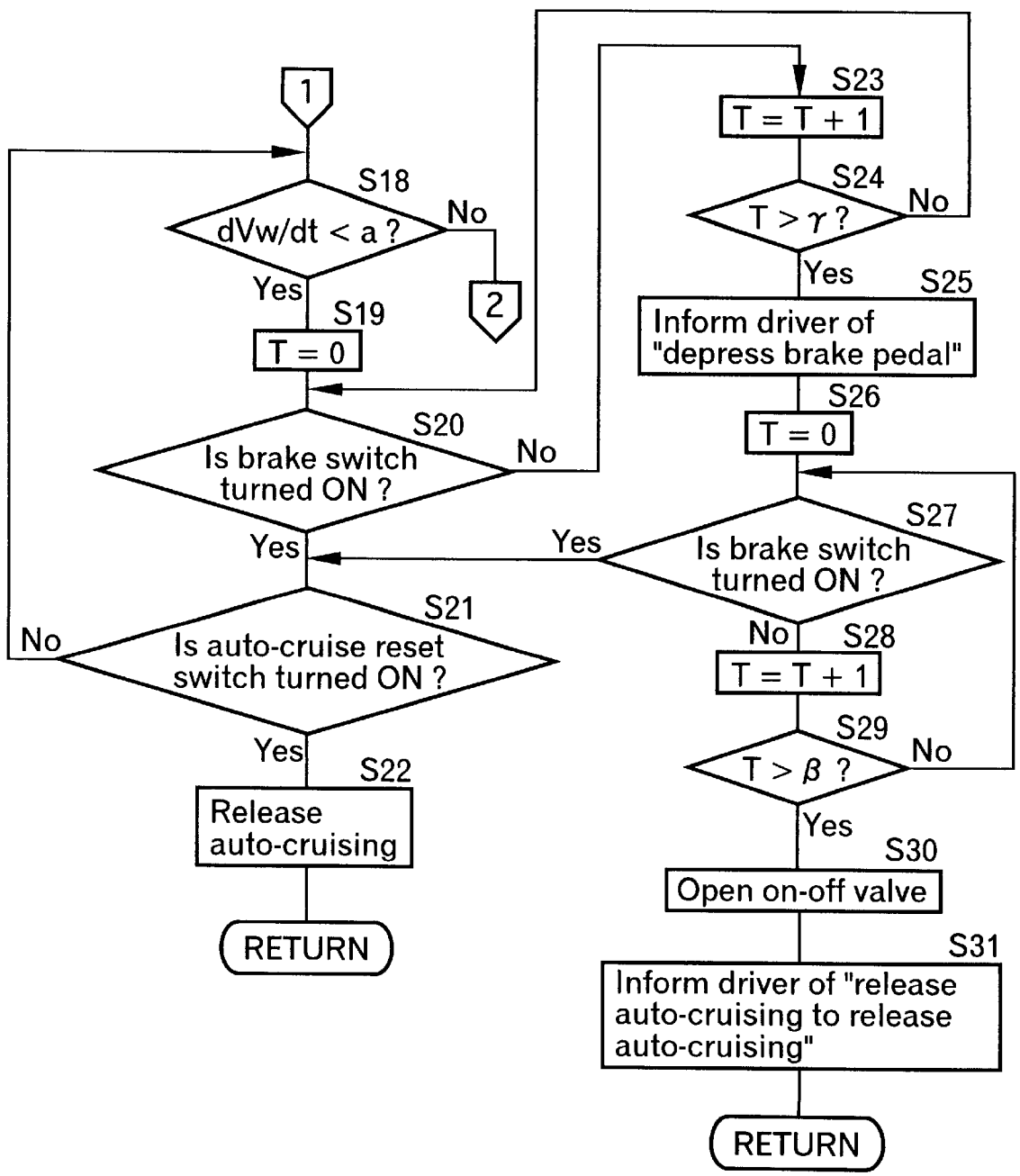
FIG. 3 is a second portion of the flow chart of FIG. 2.
Figure 5:
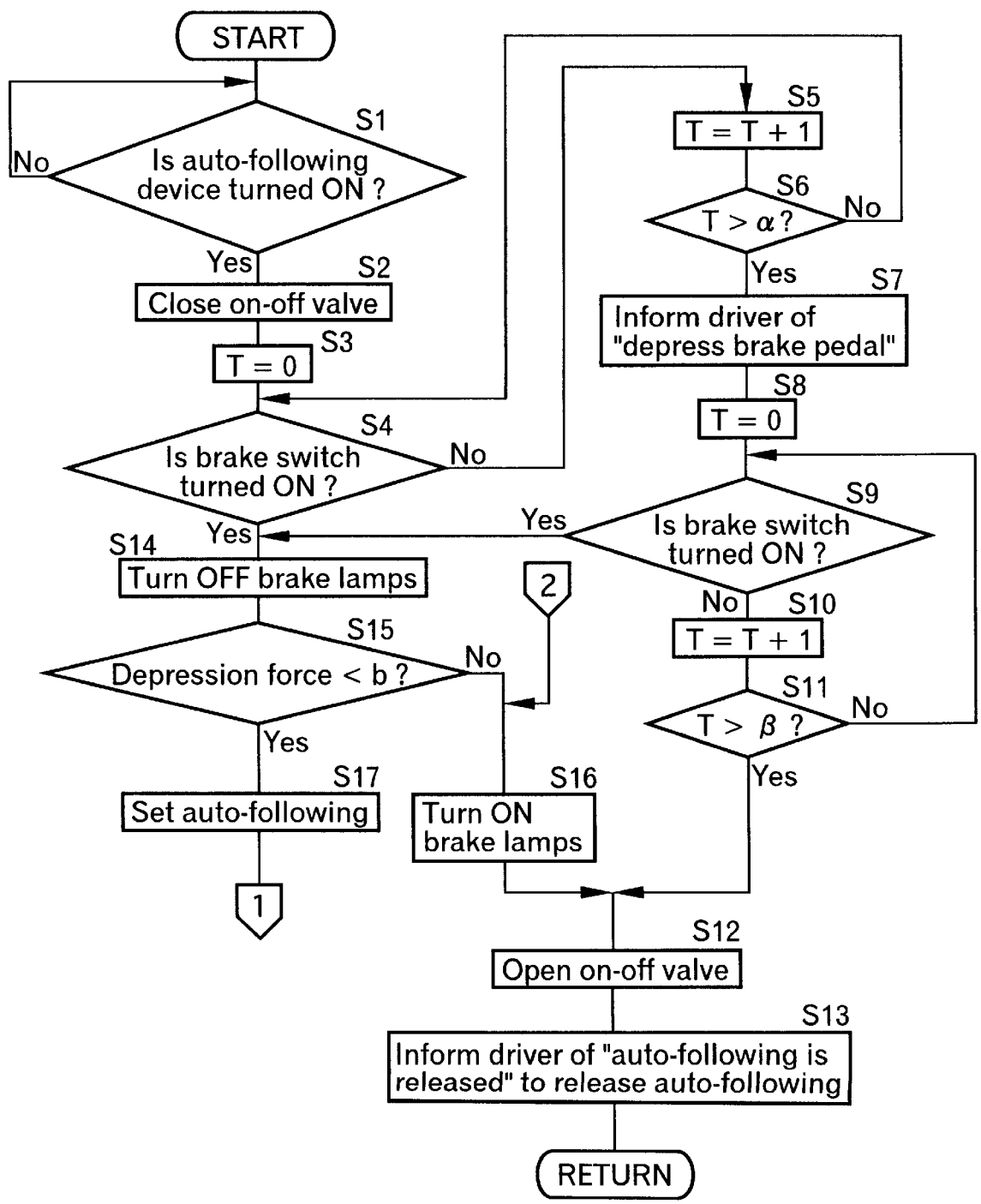
FIG. 5 is a first portion of a flow chart according to the second embodiment of the present invention.
Figure 6:
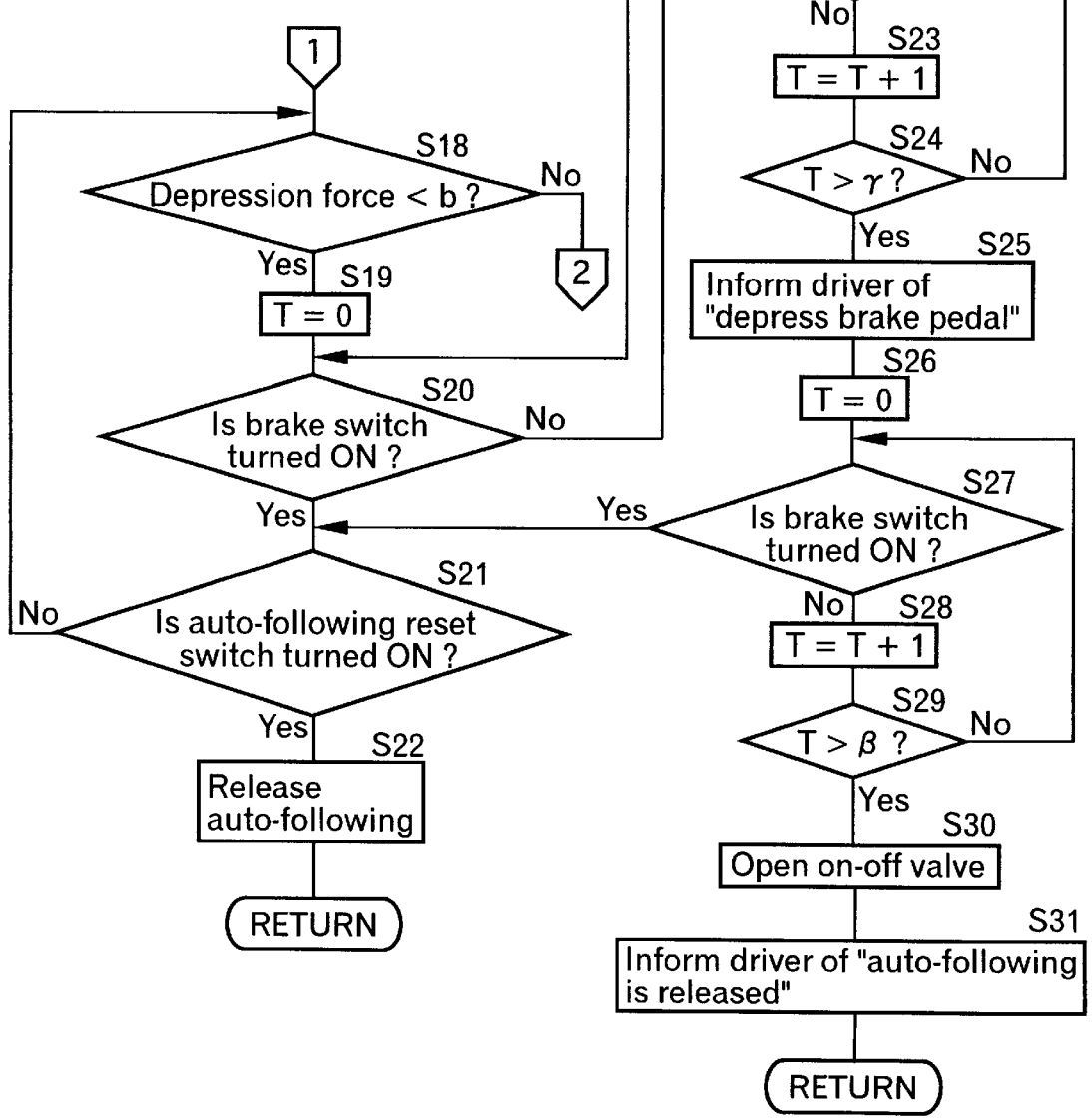
FIG. 6 is a second portion of the flow chart according to the second embodiment of the present invention.

As can be seen from the comparison of FIGS. 2 and 3, which is a flow chart for the first embodiment with FIGS. 5 and 6, which is a flow chart for the second embodiment, like step numbers are affixed to the corresponding steps, respectively. The entire arrangements of both of the flow charts are substantially identical with each other and hence, differences will be emphasized in the following description.

First, in the second embodiment, the auto-following device is included in place of the auto-cruising device used in the first embodiment and hence, the auto-cruising operation at steps S1, S13, S17, S21, S22 and S33 is replaced by an auto-following operation. The driver's braking intention is detected based on the wheel deceleration dVw/dt at steps S15 and S18 in the first embodiment, but a braking which is not based on the driver's intention is carried out in the auto-following device including an automatic brake device and hence, it is necessary to mount a brake pedal depression force sensor for detecting a depression force on the brake pedal 1 to detect a driver's braking intention. When the depression force detected by the brake pedal depression force exceeds a predetermined value b at steps S15 and S18 in the second embodiment, it is determined that the driver has a braking intention, and the auto-following is released.

Further, step S20A is added after step S20. If the driver does not put his or her foot on the brake pedal 1 at step S20 during operation of the auto-following device, it is not arranged to permit the processing to be immediately advanced to step S23, to urge the drive to put his or her foot on the brake pedal 1, but rather arranged such that only when the vehicle speed Vv detected by the wheel speed sensors 7 is not approximately 0 at step S20A the processing is advanced to step S23.

Therefore, when the vehicle speed Vv becomes substantially 0 during operation of the auto-following device, the operation of the auto-following device is not released even if the driver releases his or her foot from the brake pedal 1. Thus, when the vehicle is stopped during a traffic backup or snarl, the driver can release his or her foot from the brake pedal 1 to assume a relaxed position.

Figure 7:
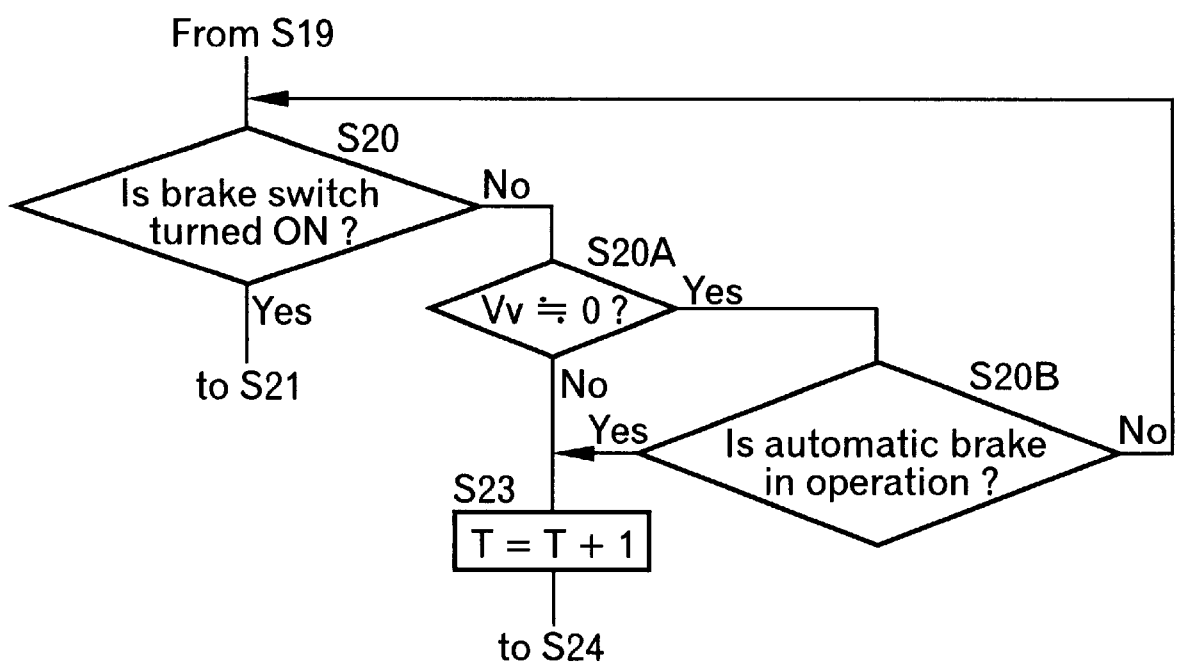
FIG. 7 is an essential portion of a flow chart according to a third embodiment of the present invention.

A third embodiment of the present invention will now be described with reference to FIG. 7.

In the third embodiment, step S20B is further added after step S20A used in the previously-described second embodiment. At step S20B, it is determined whether the automatic brake is in operation. If the automatic brake is not in operation, the processing is returned to step S20, at which the operation of the auto-following device is continued. If the automatic brake is in operation, the processing is advanced to step S23. Therefore, the on-off valve 6 can be opened during operation of the automatic brake to exhibit the usual braking characteristic, thereby preventing a sense of incompatibility from being produced.

Figure 8:
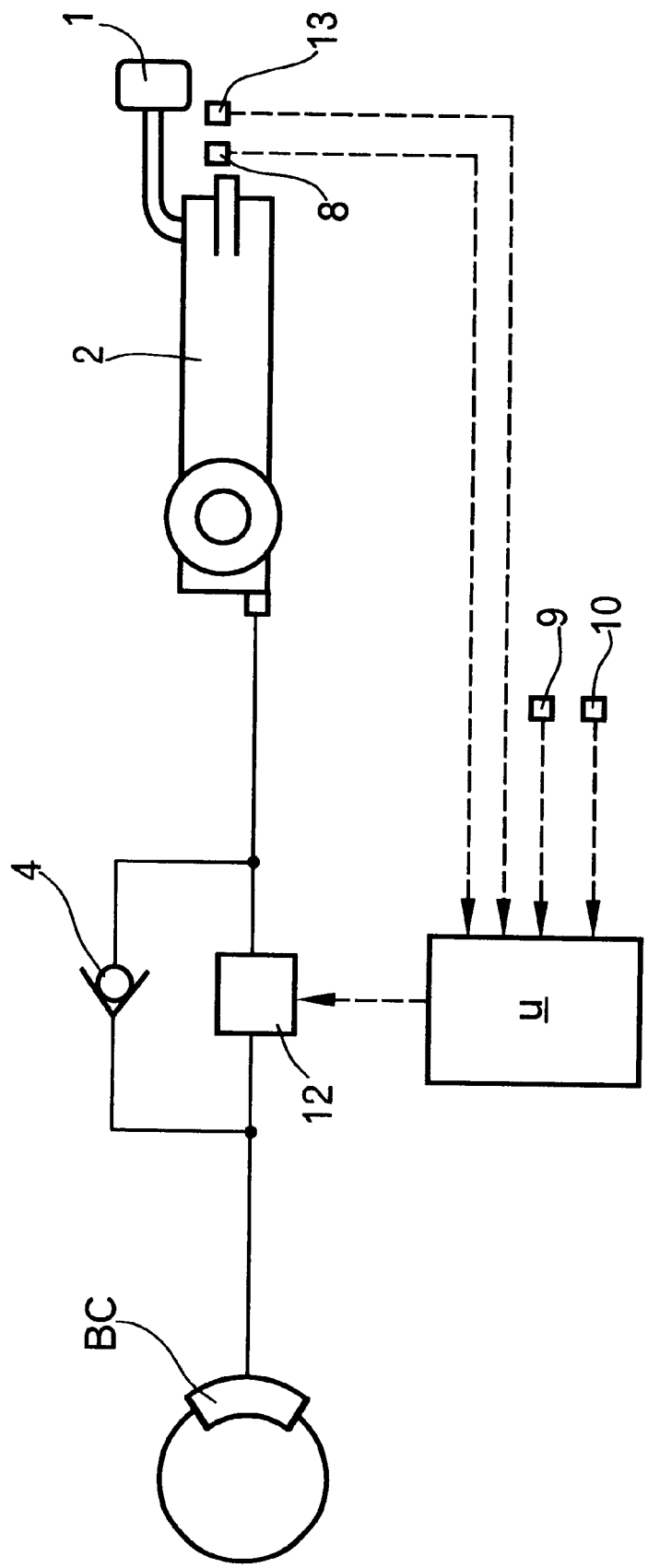
FIG. 8 is a diagrammatic illustration of a brake system according to a fourth embodiment of the present invention.

A fourth embodiment of the present invention will now be described with reference to FIG. 8.

In the fourth embodiment, the following valves are incorporated in parallel in a pipeline connecting the master cylinder and the brake calipers BC: a check valve 4 which blocks the transmission of a hydraulic pressure from the master cylinder 2 to the brake calipers BC and permits the transmission of the hydraulic pressure from the brake calipers BC to the master cylinder 2; and a linear solenoid valve 12. The electronic control unit U controls the opening degree of the linear solenoid valve 12 based on signals from the brake pedal depression force sensor 13, the brake switch 8, the auto-cruise set switch 9 and the auto-cruise reset switch 10.

During operation of the auto-cruising device, the electronic control unit U controls the opening degree of the linear solenoid valve 12 so as to provide a braking force as shown by a dashed line in FIG. 4. During non-operation of the auto-cruising device, the electronic control unit U maintains the linear solenoid valve 12 in an opened state so as to provide a braking force as shown by a solid line in FIG. 4. At this time, the magnitude of the depression force F is set slightly higher than the depression force provided when the driver puts his or her foot on the brake pedal 1 as in the first embodiment and hence, the wheel brakes BC cannot generate a braking force with a depression force provided only by using the brake pedal as a foot rest.

Figure 9:
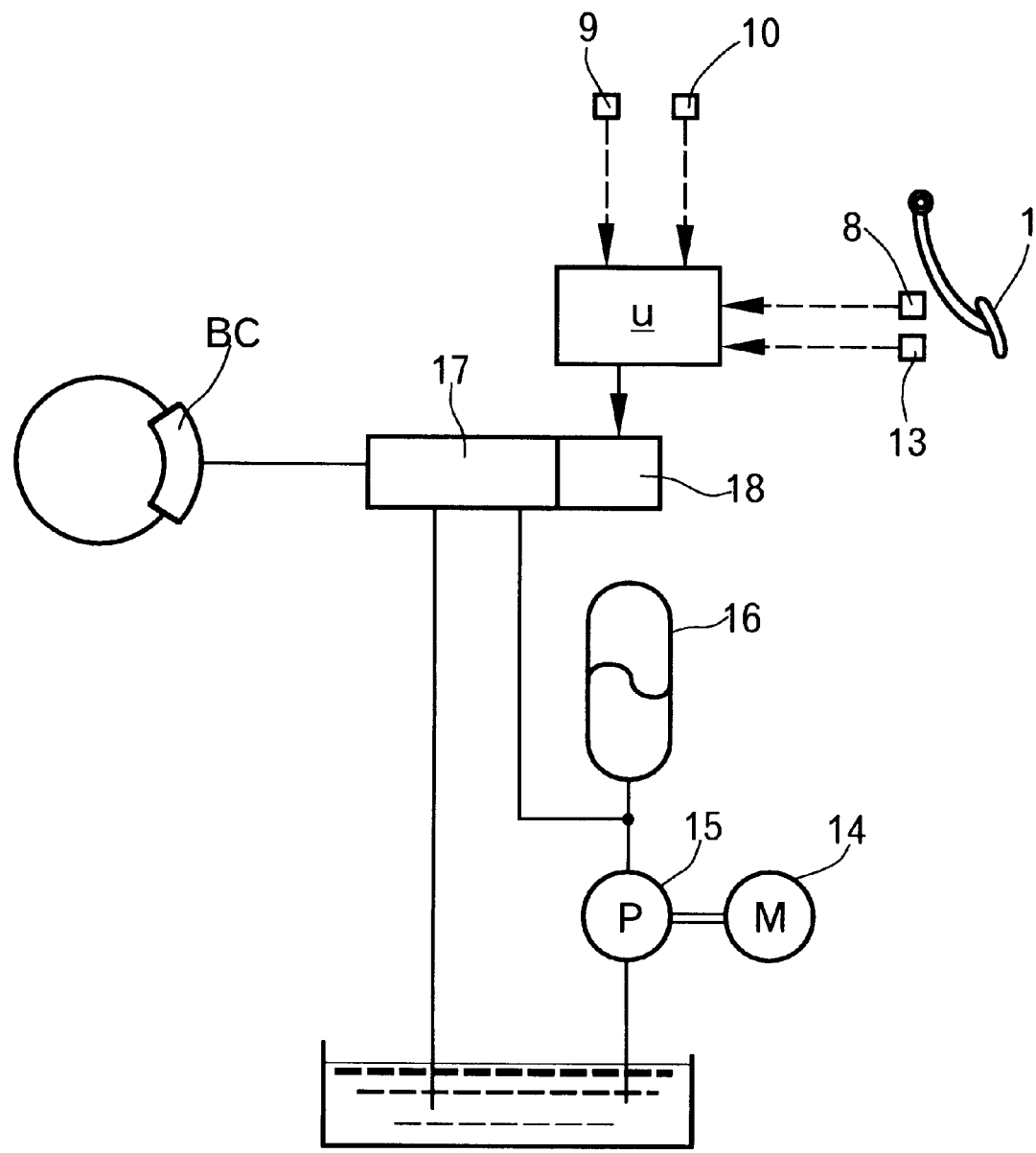
FIG. 9 is a diagrammatic illustration of a brake system according to a fifth embodiment of the present invention.

A fifth embodiment of the present invention will now be described with reference to FIG. 9.

In the fifth embodiment, a hydraulic braking pressure accumulated by a hydraulic pump 15 operated by a motor 14 is used in place of the hydraulic braking pressure generated by the master cylinder connected to the brake pedal 1. The electronic control unit U controls an accumulator 18 of a pressure control valve 17 interposed between an accumulator 16 and the brake caliper BC, based on signals from the brake pedal depression force sensor 13, the brake switch 8, the auto-cruise set switch 9 and the auto-cruise reset switch 10. Thus, during operation and non-operation of the auto-cruising device, braking forces, as respectively shown by the dashed and solid lines in FIG. 4, can be provided.

According to the fourth and fifth embodiments, a function and an effect similar to those in the previously described first embodiment can be provided.

Although the embodiments of the present invention have been described in detail, it will be understood that the present invention is not limited to the above-described embodiments, and various modifications may be made without departing from the spirit and scope of the invention defined in claims.

For example, in each of the embodiments, the auto-cruising can be set, only when the driver puts his or her foot on the brake pedal 1, but the brake system according to the present invention may be of a construction such that even if the driver puts his or her foot on the brake pedal, the auto-cruising is not reset, unless a depression force is applied. An example is disclosed in laid-open Japanese patent application number 6-336163, as follows. In addition, an auto-steering device for controlling the engine output power, the brake system, the steering device or the like by determining the shape of a road or the positional relationship between the subject vehicle and another vehicle may be employed in place of the auto-following device in the second embodiment.

What is claimed is:

1. A brake system in a vehicle having brake calipers and a brake master cylinder, and including an automatic traveling device capable of maintaining traveling of the vehicle in a state in which a driver has released his or her foot from an accelerator pedal, said brake system comprising a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein said control means includes at least a relief valve and an ON-OFF valve operably connected in parallel between said brake calipers and said brake master cylinder, wherein said relief valve allows transmission of hydraulic pressure from said brake master cylinder to said brake calipers when the depression force on the brake pedal is equal to or larger than said predetermined value.

2. A brake system in a vehicle according to claim 1, wherein said ON-OFF valve is closed during operation of said automatic traveling device and opened to permit hydraulic pressure to be fed from the brake master cylinder to the brake calipers therethrough during non-operation of said automatic traveling device.

3. A brake system in a vehicle including an automatic traveling device capable of maintaining traveling of the vehicle in a state in which a driver has released his or her foot from an accelerator pedal, wherein said brake system comprises a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein a relationship of the braking force of the wheel brake to the depression force on the brake pedal is varied between one obtained during operation of said automatic traveling device and another obtained during non-operation of said automatic traveling device.

4. A brake system in a vehicle including an automatic traveling device capable of maintaining traveling of the vehicle in a state in which a driver has released his or her foot from an accelerator pedal, wherein said brake system comprises a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein said automatic traveling device can be operated in a state in which the driver does not put his or her foot on the brake pedal, only when the vehicle speed is equal to or lower than a predetermined value, and wherein said automatic traveling device includes an automatic brake device, and during operation of said automatic brake device, a relationship of the braking force of the wheel brake to the depression force on the brake pedal is switched to another relationship during non-operation of the automatic traveling device.

5. A brake system in a vehicle including brake calipers, a brake master cylinder, and an automatic traveling device capable of maintaining traveling of the vehicle in a state in which a driver has released his or her foot from an accelerator pedal, wherein said brake system comprises a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein said control means includes at least a relief valve and an ON-OFF valve operably connected in parallel between said brake calipers and said brake master cylinder, and wherein a relationship of the braking force of the wheel brake to the depression force on the brake pedal is varied during operation of said automatic traveling device and during non-operation of said automatic traveling device.

6. A brake system in a vehicle including brake calipers, a brake master cylinder, and an automatic traveling device capable of maintaining traveling of the vehicle in a state in which a driver has released his or her foot from an accelerator pedal, wherein said brake system comprises a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein said control means includes at least a relief valve and an ON-OFF valve operably connected in parallel between said brake calipers and said brake master cylinder, and wherein said automatic traveling device can be operated in a state in which the driver does not put his or her foot on the brake pedal, when the vehicle speed is equal to or lower than a predetermined value.

7. A brake system in a vehicle including brake calipers, a brake master cylinder, and an automatic traveling device capable of maintaining traveling of the vehicle in a state in which a driver has released his or her foot from an accelerator pedal, wherein said brake system comprises a control means which does not operate wheel brakes when said automatic traveling device is in operation and the depression force on a brake pedal is smaller than a predetermined value, and which operates the wheel brakes when the depression force on the brake pedal is equal to or larger than said predetermined value, wherein said control means includes at least a relief valve and an ON-OFF valve operably connected in parallel between said brake calipers and said brake master cylinder, and wherein, when the depression force on the brake pedal is equal to or larger than said predetermined value, a brake lamp is turned on.

* * * * *